US008905851B2

(12) United States Patent
Geislinger et al.

(10) Patent No.: US 8,905,851 B2
(45) Date of Patent: Dec. 9, 2014

(54) TORSIONAL VIBRATION DAMPER OR ROTATIONALLY ELASTIC COUPLING

(71) Applicant: Ellergon Antriebstechnik Gesellschaft m.b.H., Hallwang (AT)

(72) Inventors: Matthias Geislinger, Hallwang (AT); Cornelius Geislinger, Hallwang (AT)

(73) Assignee: Ellergon Antriebstechnik Gesellschaft m.b.H., Hallwang (AT)

( * ) Notice: Subject to any disclaimer, the term of this patent is extended or adjusted under 35 U.S.C. 154(b) by 0 days.

(21) Appl. No.: 13/934,057

(22) Filed: Jul. 2, 2013

(65) Prior Publication Data
US 2014/0066215 A1    Mar. 6, 2014

(30) Foreign Application Priority Data
Aug. 28, 2012    (EP) .................................... 12181966

(51) Int. Cl.
*F16D 3/12* (2006.01)
*F16F 15/16* (2006.01)
*F16D 3/56* (2006.01)
*F16F 15/121* (2006.01)
*F16F 13/00* (2006.01)
*F16F 15/133* (2006.01)

(52) U.S. Cl.
CPC . *F16D 3/12* (2013.01); *F16F 15/16* (2013.01); *F16D 3/56* (2013.01); *F16F 15/1215* (2013.01); *F16F 13/00* (2013.01); *F16F 15/1336* (2013.01)
USPC ............................. 464/28; 464/82; 464/100

(58) Field of Classification Search
USPC ............................. 464/7, 28, 82, 84, 100, 101
See application file for complete search history.

(56) References Cited

U.S. PATENT DOCUMENTS 3,996,767 A * 12/1976 Geislinger ...................... 464/82

FOREIGN PATENT DOCUMENTS

| AT | 212649    | * | 12/1960 | ............. 464/82 |
| DE | 629979    |   | 5/1936  |                     |
| DE | 700 248   | * | 12/1940 | ............. 464/82 |
| DE | 1202590   |   | 10/1965 |                     |
| DE | 3033302 A1|   | 4/1981  |                     |
| FR | 1.298.735 | * | 6/1962  | ............. 464/82 |
| GB | 2250569 A |   | 6/1992  |                     |

OTHER PUBLICATIONS

International Search Report issued for corresponding International Patent Application EP12181966.8 mailed Jan. 30, 2013.
International Search Report for European Application No. 12 181 966.8-1751, mail date Mar. 28, 2014.

* cited by examiner

*Primary Examiner* — Gregory Binda
(74) *Attorney, Agent, or Firm* — Myers Wolin, LLC (57) ABSTRACT

A torsional vibration damper or rotationally elastic coupling comprises: an outer housing including a flange; an inner part arranged within and rotatable relative to the outer housing; a plurality of intermediate pieces arranged around the inner part and spaced apart from each other in circumferential direction so as to form a plurality of chambers filled with a damping medium; a plurality of leaf spring assemblies having one or more leaf springs, said leaf spring assemblies being arranged in said chambers and having outer end portions engaging with receptacles formed between neighboring intermediate pieces and inner end portions engaging with the inner part; and a clamping ring extending around the intermediate pieces and the leaf spring assemblies for securing the leaf spring assemblies between the intermediate pieces.

20 Claims, 5 Drawing Sheets

TORSIONAL VIBRATION DAMPER OR ROTATIONALLY ELASTIC COUPLING

CROSS REFERENCE TO RELATED APPLICATIONS

This application claims priority under 35 USC §119 to European Patent Application No. EP 12181966.8 filed on Aug. 28, 2012, the contents of which are incorporated herein by reference.

FIELD OF THE INVENTION

The present invention relates to a torsional vibration damper or rotationally elastic coupling, comprising an outer housing including a flange, an inner part arranged within and rotatable relative to the outer housing, a plurality of intermediate pieces arranged around the inner part and spaced apart from each other in circumferential direction so as to form a plurality of chambers filled with a damping medium, a plurality of leaf spring assemblies having one or more leaf springs, said leaf spring assemblies being arranged in said chambers and having outer end portions engaging with receptacles formed between neighbouring intermediate pieces and inner end portions engaging with the inner part, and a clamping ring extending around the intermediate pieces and the leaf spring assemblies for securing the leaf spring assemblies between the intermediate pieces.

Torque is transmitted from the inner part to the outer housing and vice versa via the leaf spring assemblies which at the same time limit rotation between the inner part and outer housing relative to each other. Thus, the inner part and outer housing may oscillate relative to each other in circumferential direction of the coupling or damper. Due to this rotational oscillation the damping medium in the chambers is displaced to thereby create a damping effect. In a coupling, the outer housing is connected with a first shaft and the inner part is connected with a second shaft. In a damper either the inner part or the outer housing may be coupled to the structure that requires damping.

BACKGROUND

Dampers and couplings of this type are primarily used in large two-stroke and four-stroke diesel engines and gas engines for counteracting torsional vibrations in the power train. They may reach outer diameters of up to three meters.

Dampers and couplings of this type are known e.g. from DE 1 202 590 A or DE 30 33 302 A.

In order to provide defined damping properties the leaf spring assemblies have to be mounted very precisely between the intermediate pieces so as to correctly engage with the inner part. Further, their flexural behavior must be adapted to the desired purpose of application, which usually requires individual machining of the leaf springs. Usually, the leaf spring assemblies and the intermediate pieces are arranged on a flange and subsequently secured against each other by pressing or heat shrinking a clamping ring on the outer circumference of the leaf spring assemblies and of the intermediate pieces to create a clamping force in circumferential direction. Subsequently, this unit is fixed on the flange by means of screws connecting the intermediate pieces with the flange.

In this connection, DE 1 202 590 A suggests one or more inner rings between the clamping ring and the leaf spring assemblies and the intermediate pieces. The inner ring or rings have an axially tapered outer circumference engaging with a correspondingly tapered conical inner circumference of the clamping ring. Upon mounting the leaf springs assemblies and the intermediate pieces in the inner ring the outer clamping ring is placed on the outer circumference of the inner ring and pressed thereon axially by tensioning oppositely arranged flanges of the outer housing against each other via screws. These screws also secure the intermediate pieces on the outer housing and thus position the leaf spring assemblies and the intermediate pieces relative to the inner part.

The use of additional inner rings renders assembly of the damper or coupling complicated and laborious. Since the leaf spring assemblies and the intermediate pieces may slightly move relative to each other and further, as setting effects may occur, proper positioning of the leaf spring assemblies is difficult. In addition, setting of the intermediate pieces may reduce the overflow channels between the chambers and thus affect the damping properties.

As an alternative, DE 30 33 302 A suggests pressing a plurality of wedges between the leaf spring assemblies and the intermediate pieces, in which case the additional inner rings and a taper at the clamping ring can be avoided.

In both cases the leaf spring assemblies are clamped in circumferential direction, i.e. between substantially parallel side walls of the intermediate pieces to avoid reaction forces in radial direction.

SUMMARY

The present invention aims at improving manufacture of a torsional vibration damper or rotationally elastic coupling of the type indicated above while maintaining precise positioning and secure clamping of the leaf spring assemblies.

This technical problem is solved by a torsional vibration damper or rotationally elastic coupling, comprising: an outer housing including a flange; an inner part arranged within and rotatable relative to the outer housing; a plurality of intermediate pieces arranged around the inner part and spaced apart from each other in circumferential direction so as to form a plurality of chambers filled with a damping medium; a plurality of leaf spring assemblies having one or more leaf springs, said leaf spring assemblies being arranged in said chambers and having outer end portions engaging with receptacles formed between neighbouring intermediate pieces and inner end portions engaging with the inner part; and a clamping ring extending around the intermediate pieces and the leaf spring assemblies for securing the leaf spring assemblies between the intermediate pieces; wherein the receptacles between neighbouring intermediate pieces and the corresponding radially outer end portions of the leaf spring assemblies taper radially inwardly; the intermediate pieces are formed integrally on said flange of the outer housing; and the radially outer end portions of the leaf spring assemblies are urged radially into the receptacles by the clamping ring.

In particular, the receptacles formed between neighbouring intermediate pieces and the corresponding radially outer end portions of the leaf spring assemblies taper radially inwardly, the intermediate pieces are formed integrally on said flange of the outer housing, and the radially outer end portions of the leaf spring assemblies are urged radially into said receptacles by said clamping ring.

This configuration simplifies assembly of the damper or coupling and provides precise positioning of the leaf spring assemblies. Moreover, it is possible to obtain desired damping properties within narrow tolerance ranges.

By integrally forming the intermediate pieces on the flange of the outer housing any setting effects are limited to the leaf spring assemblies and thus can be reduced substantially as compared to the prior art discussed above as in particular any setting of the intermediate pieces can be excluded.

The leaf spring assemblies are urged radially into the receptacles formed between the intermediate pieces and thus are properly held in position. The clamping ring acting radially on these leaf spring assemblies may easily compensate any setting effects occurring at the leaf spring assemblies.

The reduced number of parts facilitates assembly and reduces costs.

As the intermediate pieces are integral with the flange, corresponding massive screws as required in the prior art for the reason of torque transmission can be avoided, for which reason the flange can be made with reduced thickness. This helps reducing the overall weight of the damper or coupling and adds further to a reduction of manufacturing costs.

In a preferred embodiment the clamping ring is spaced apart from the intermediate pieces by radial gaps. This secures proper contact between the inner circumference of the clamping ring and the radial end faces of the leaf spring assemblies.

In yet another preferred embodiment the clamping ring has an inner circumference engaging with the outer end portions of the leaf spring assemblies, wherein the inner circumference tapers axially and the outer end portions of the leaf spring assemblies have correspondingly tapered end faces. The clamping ring can thus be fitted directly on the leaf spring assemblies after the latter have been placed with their outer end portions in the receptacles between neighbouring intermediate pieces.

Preferably, the clamping ring is axially pressed onto the outer end portions of the leaf spring assemblies.

However, it is also possible to form the clamping ring integrally with the flange of the outer housing, in which case costs can be reduced further. The leaf spring assemblies may then be pressed axially into said receptacles between neighbouring intermediate pieces that are formed integrally on said flange and delimited radially by the clamping ring that is formed integrally on said flange.

In yet another preferred embodiment the outer housing comprises a further flange arranged opposite the said first mentioned flange, said further flange being secured on said intermediate pieces and extending radially so as to at least partly cover an axial face of the clamping ring. The further flange closes the chambers of the damper or coupling, and by overlapping the clamping ring may be used for axially pressing the clamping ring onto the leaf spring assemblies and/or for securing the same.

In another preferred embodiment the intermediate pieces have been formed integrally on said first mentioned flange by milling. In other words, the intermediate pieces have milled surface portions.

Further, overflow channels are preferably formed between radially inner ends of the intermediate pieces and an outer circumference of the inner part. These overflow channels provide hydraulic connections between neighbouring chambers to cause damping when damping medium flows through them. This avoids separate machining of overflow channels e.g. through the intermediate pieces.

In yet another preferred embodiment axial grooves are formed on the inner part. The axial grooves engage with inner end portions of said leaf spring assemblies in an articulated manner and thus allow for relatively large rotational angles between the inner part and outer housing.

DETAILED DESCRIPTION

Figure 1:
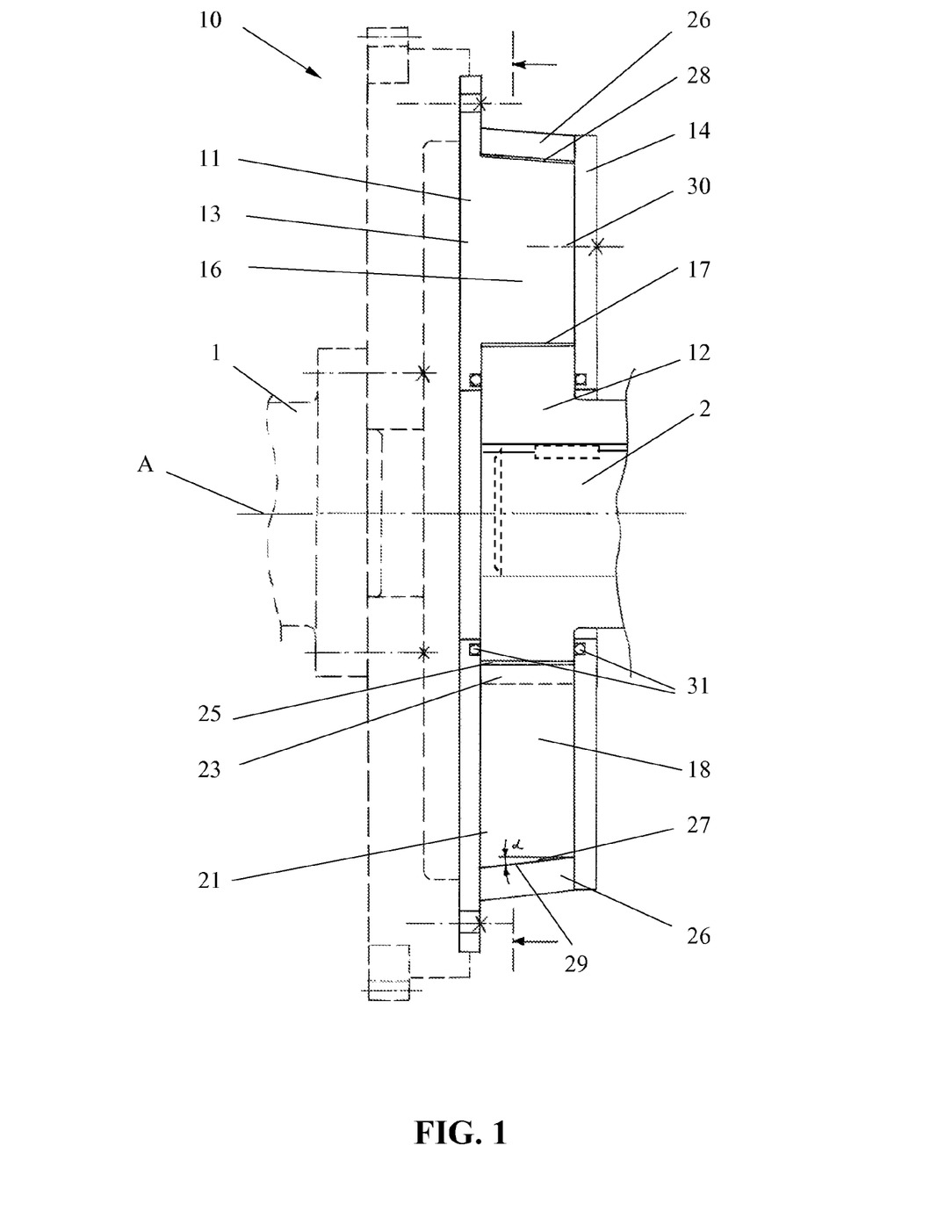
FIG. 1 shows a schematic longitudinal sectional view of a rotationally elastic coupling according to a first embodiment of the invention.
Figure 2:
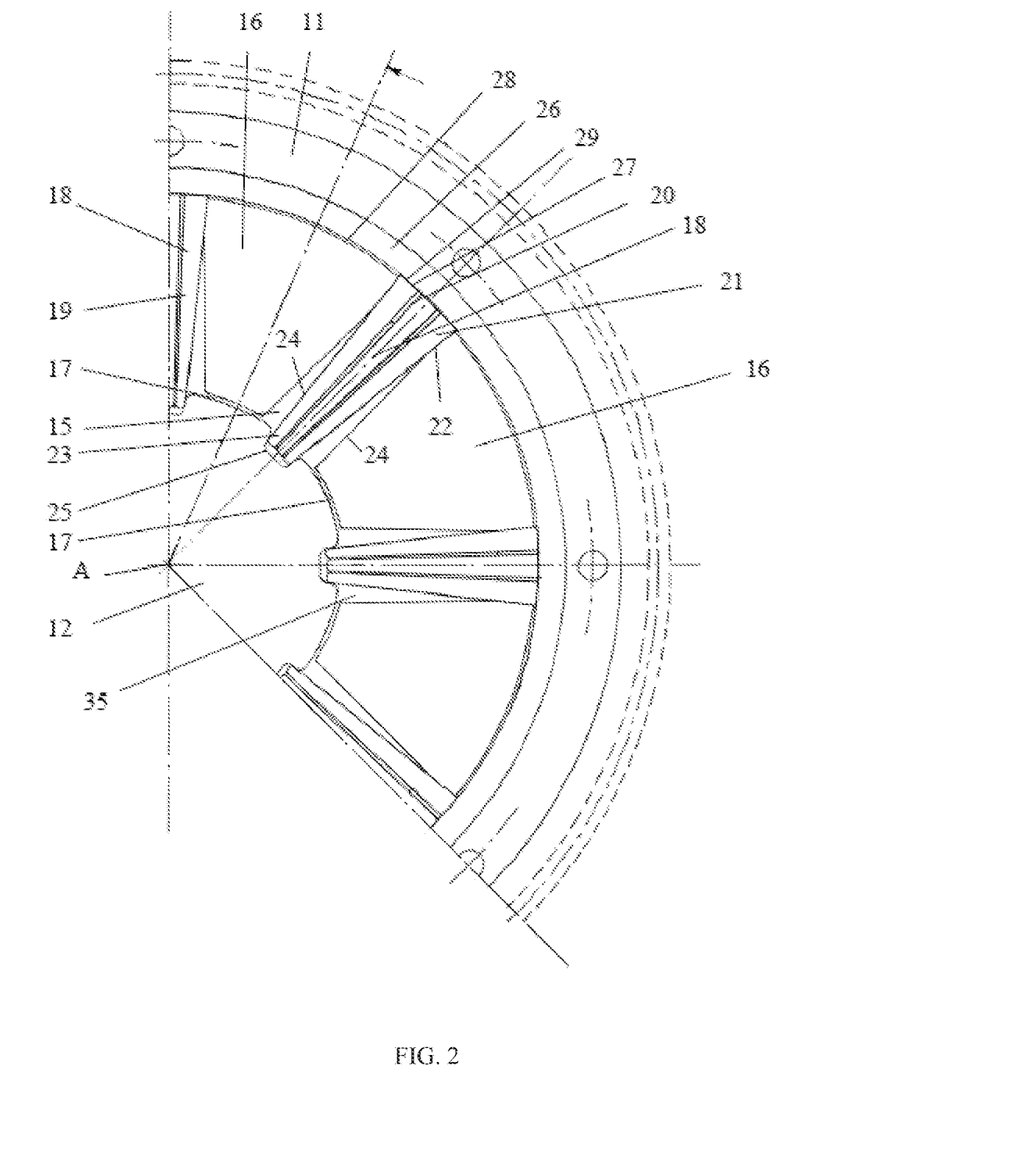
FIG. 2 shows a sectional view of the rotationally elastic coupling of FIG. 1.
Figure 3:
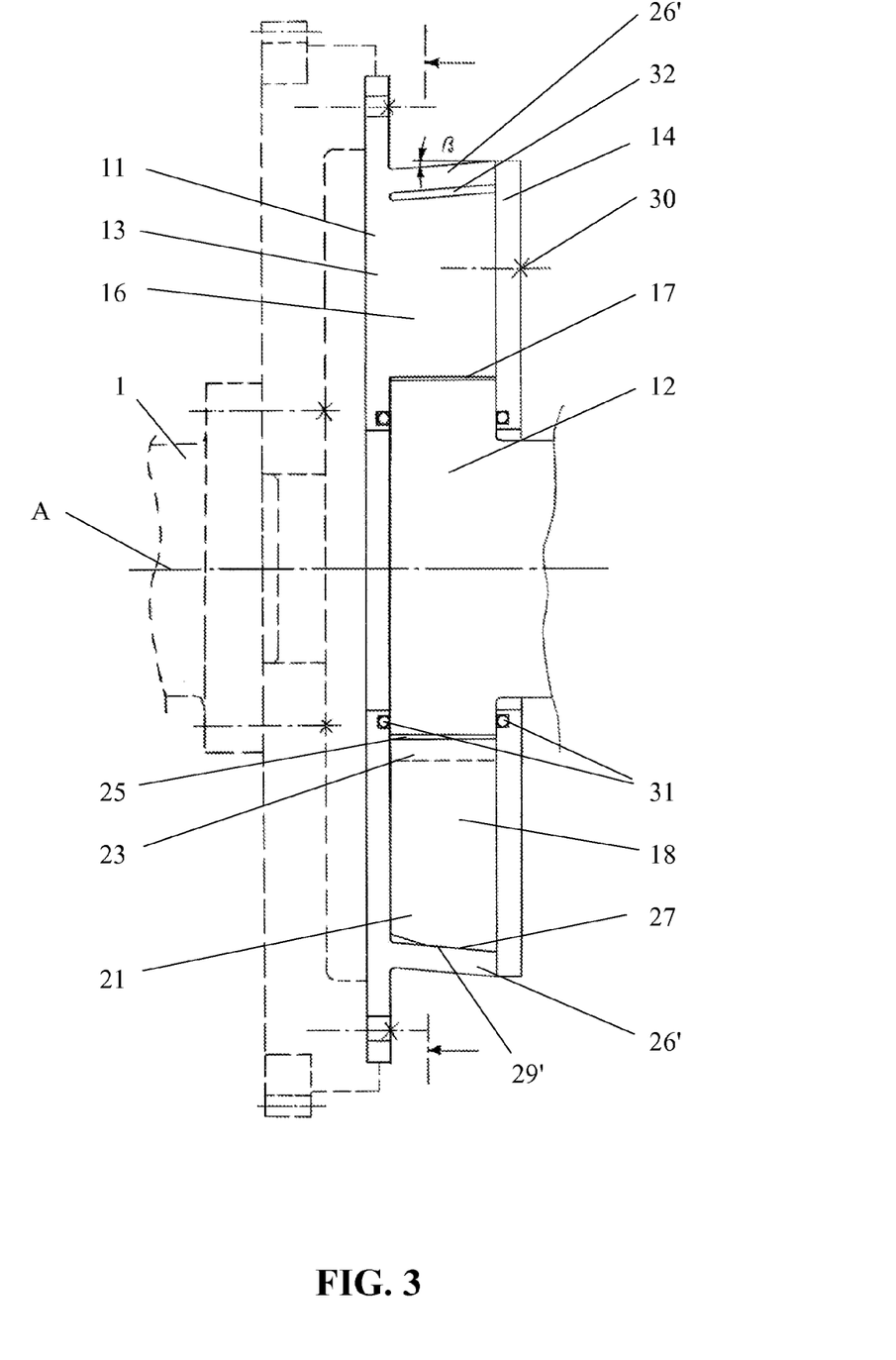
FIG. 3 shows a schematic longitudinal sectional view of a rotationally elastic coupling according to a second embodiment of the invention.

FIGS. 1, 2, and 3 show a rotationally elastic coupling 10 for connecting a first shaft 1 with a second shaft 2 to transmit torque between said shafts 1 and 2 and to dampen oscillations or variations of torque during torque transmission.

The coupling 10 comprises an outer housing 11 rotatable about a longitudinal axis A and an inner part 12 that is arranged within the outer housing 11 and rotatable about the same longitudinal axis A relative to the outer housing 11. The inner part 12 is concentric relative to the outer housing 11.

The outer housing 11 includes a first flange 13 and a second flange 14 that are arranged opposite each other and both sealed against the inner part 12.

The outer housing 11 and the inner part 12 radially delimit a plurality of separate chambers 15, which are filled with a damping medium 35, such as pressurized oil. The chambers 15 are arranged in sequence in circumferential direction around the inner part 12 and separated by intermediate pieces 16 that are spaced apart from each other. However, neighbouring chambers 15 are hydraulically connected through overflow channels 17 extending past the intermediate pieces 16. The overflow channels 17 are preferably formed by gaps between radially inner ends of the intermediate pieces 16 and the outer circumference of the inner part 12. They may as well extend through the intermediate pieces 16.

The intermediate pieces 16 are integrally formed with the first flange 13. They can be made e.g. through milling of corresponding portions of the first flange 13.

A plurality of leaf spring assemblies 18 is arranged in the chambers 15, respectively. Each leaf spring assembly 18 consists of at least one leaf spring 19 or may include several leaf springs 19 in stacked arrangement. The leaf springs 19 are preferably made of spring steel but any other suitable material is possible. Moreover, the leaf springs 19 may taper radially inwardly towards their radially inner end. If required, washers 20 can be arranged between neighbouring leaf springs 19 in a leaf spring assembly 18.

Each leaf spring assembly 18 has an outer end portion 21 engaging with a corresponding receptacle 22 that is formed between neighbouring intermediate pieces 16. The leaf spring assembly 18 is held in the corresponding receptacle 22 in a bending resistant or flexurally rigid manner. In other words, a bending moment acting on the leaf spring assembly 18 during operation of the coupling is supported by and transmitted into the receptacle 22.

The receptacles 22 taper radially inwardly. Moreover, the radially outer end portions 21 of the leaf spring assemblies 18 taper radially inwardly in the same manner as the receptacles 22. Accordingly, the leaf spring assemblies 18 contact corresponding portions of side walls 24 of the intermediate pieces 16 at their radially outer end portions 21 but are otherwise clear of these side walls 24. Extensions of parallel segments of side walls 24 are shown as dashed lines 36, and contrast with the receptacles 22 which form a tapered section of the side walls 24. Outside the receptacles 22, the distance between the leaf spring assemblies 18 and the side walls 24 of the intermediate pieces 16 increases towards the inner end portion 23 of the respective leaf spring assembly 18 to provide sufficient space for free bending of the leaf spring assemblies 18 in circumferential direction of the coupling.

The inner end portions 23 of the leaf spring assembly 18 extend into axial grooves 25 at the outer circumference of the inner part 12. The inner end portions 23 constitute free ends that engage with the axial grooves 25 in an articulated manner. In other words, the free ends of the leaf spring assembly 18, though bearing against opposed flanks of the grooves 25 with zero-clearance may, move relative to the grooves 25 in a sliding and or rolling manner to allow for larger angular displacement, i.e. limited relative rotation between the inner part 12 and outer housing 11.

In operation, such relative rotation between the inner part 12 and outer housing 11 causes the leaf spring assemblies 18 to bend back and forth in circumferential direction of the coupling which in turn generates displacement of damping medium 35 through the overflow channels 17 resulting in a damping effect.

The leaf spring assemblies 18 are held in position by a clamping ring 26 extending around the intermediate pieces 16 and the leaf spring assemblies 18. This clamping ring secures the leaf spring assemblies 18 between the intermediate pieces 16. More specifically, the clamping ring 26 urges the leaf spring assemblies 18 radially inwardly. Accordingly, the radially inwardly tapered outer end portions 21 of the leaf spring assemblies 18 are pressed radially against the side wall portions of the intermediate pieces 16 that define the corresponding receptacles 22 and narrow radially inwardly in the same way.

End faces 27 of the leaf spring assemblies 18 protrude radially outwardly beyond the intermediate pieces so that the clamping ring 26 contacts the leaf spring assemblies 18 but not the intermediate pieces 16. The clamping ring 26 is spaced apart from the intermediate pieces 16 by radial gaps 28.

In the first embodiment of FIGS. 1 and 2 the clamping ring 26 is a separate element that is to be fixed around the leaf spring assemblies 18. It is a continuous ring without interruption. The clamping ring 26 has a conical inner circumference 29, i.e. is provided with an axial taper shown by angle α in FIG. 1. The end faces 27 or the leaf springs are correspondingly tapered.

During assembly, the leaf spring assemblies 18 are inserted into the chambers 15 so that their outer end portions 21 engage with the receptacles 22. Subsequently, the clamping ring 26 is pressed with its conical inner circumference 29 axially onto the tapered end faces 27 of the leaf spring assemblies to urge the outer end portions 21 of the leaf spring assemblies 18 radially into the corresponding receptacles 22.

Since the intermediate pieces 16 are formed integrally with the first flange 13 the position of the leaf spring assemblies 16 is in no way affected by any setting effects of the intermediate pieces 16, though still some setting may occur within the leaf spring assemblies 18 themselves. However, because of the stable position of the intermediate pieces 16 it is possible to better control such setting effects, e.g. by providing a sufficient radial overhang of the outer end portions 21 of the leaf spring assemblies 18 beyond the outer ends of the intermediate pieces 16 and/or by placing one or more washers 20 between the leaf springs 19. The inner end portions 23 of the leaf spring assemblies 18 may thus engage very precisely with the axial grooves 25 at outer circumference of the inner part 12. In addition, the integral intermediate pieces 16 allow for a good control of the size of the overflow channels 17 between the inner ends of the intermediate pieces 16 and the outer circumference of the inner part 12. As a result, it is possible to tune the damping properties of the coupling or a corresponding damper very exactly and without much assembly effort.

After the clamping ring 26 has been fitted around the end faces 27 of the leaf spring assemblies 18 the housing may be closed by mounting the second flange 14. The second flange 14 may extend radially so as to at least partly cover an axial face of the clamping ring 26. It can be secured on the first flange 13 at the intermediate pieces 16 by means of screws 30. Sealing rings 31 between the flanges 13 and 14 and the inner part 12 seal the oil filled chambers 15 against the exterior.

The afore described rotationally elastic coupling, which provides a defined torsional flexibility, combines the advantages of a low number of required individual components, simple assembly and precise damping properties within a narrow tolerance band. In addition, the weight of the coupling can be reduced as the flanges 13 and 14 can be made thinner than in conventional couplings.

FIG. 3 shows a second embodiment which differs from the first embodiment merely by the clamping ring and the way the leaf spring assemblies are mounted between the intermediate pieces. Unless specified otherwise below, the coupling according to the second embodiment corresponds to the first embodiment for which reason same reference numbers are used for indicating like components.

In the second embodiment, not only the intermediate pieces 16 but also the clamping ring 26' is formed integrally with the first flange 13 of the outer housing 11. The first flange 13 is again radially separate form the intermediate pieces 16 as shown by gap 32 in FIG. 3. It has a conical inner circumference 29' which is shown by taper angle 13 in FIG. 3. The conical shape opens towards the second flange 14.

The leaf spring assemblies 18 are pressed axially into the receptacles 22 between neighbouring intermediate pieces 16. As in the first embodiment, they have end faces 27 that protrude radially outwardly beyond the intermediate pieces 16 to engage with the conical inner circumference 29' of the clamping ring 26'. By pressing the leaf spring assemblies 18 in their receptacles 22 the clamping ring 26' is widened slightly in radial direction and thus urges the inwardly tapering outer end portions 21 of leaf spring assemblies 18 against the receptacles 22 that are formed by opposed portions of the side walls 24 of neighbouring intermediate pieces 16 and have a corresponding angle of taper.

This embodiment avoids the need of producing a separate clamping ring. The clamping ring and the intermediate pieces can be formed by milling corresponding portions of the flange 13. As these structures are provided at the same side of the first flange 13 they can be shaped or cut in one operation.

Figure 4:
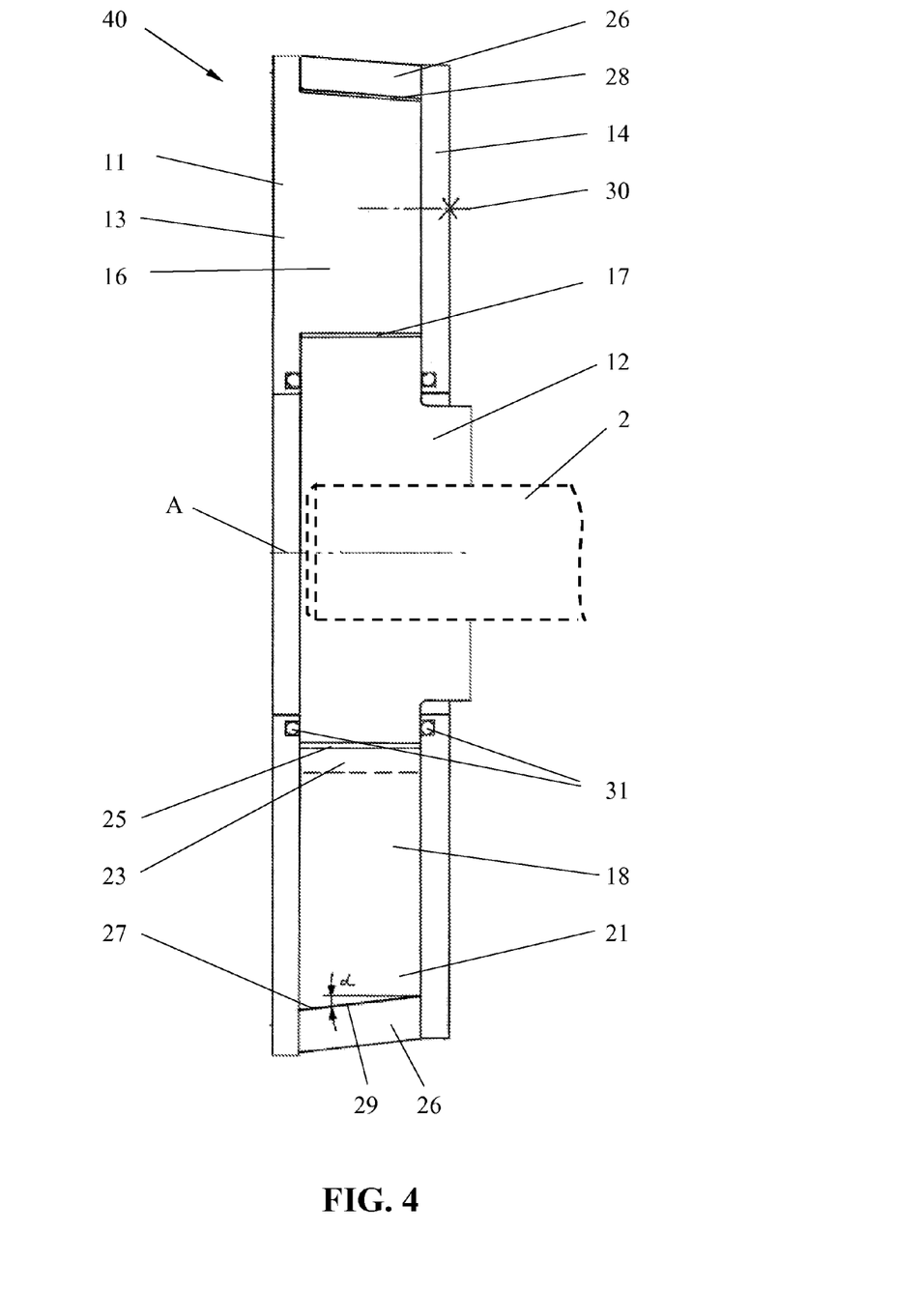
FIG. 4 shows a schematic longitudinal sectional view of a torsional vibration damper according to a third embodiment of the invention.
Figure 5:
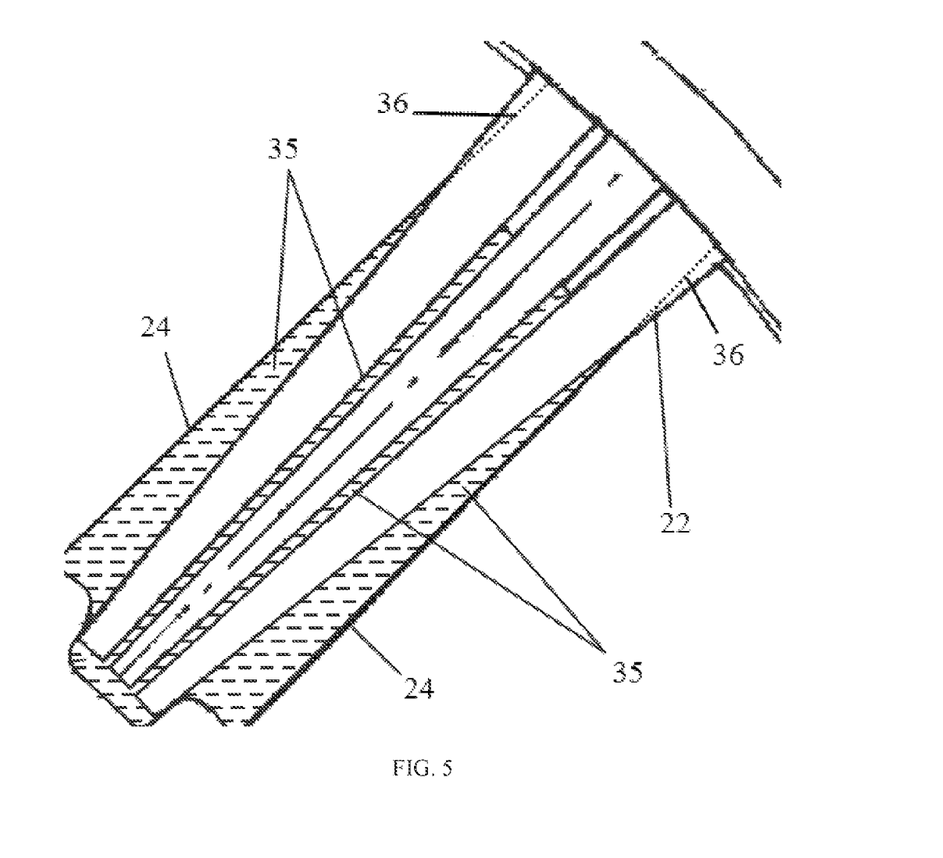
FIG. 5 shows a sectional view of the rotationally elastic coupling of FIG. 1.

The first and second embodiments describe the inventive principles in connection with a torsionally flexible coupling. However, it is also possible to apply these principles to a torsional vibration damper 40 as shown by example in FIG. 4. The internal structure of the outer housing 11 and inner part 12 as well as the leaf spring assemblies 18 and the clamping ring 26/26' may be exactly the same as in these embodiments. The only difference concerns the outer connection of the inner part 12 and/or outer housing 11 with exterior structures. In the embodiment shown in FIG. 4 the inner part 12 is connected to the part that requires damping, here shaft 2. The outer housing 11 is free to swing about the inner part 12 and thus not connected to any other structure. Generally, it would also be possible to join the damper via the outer housing 11 with a structure that requires damping, in which case the inner part 12 would be then allowed to rotate freely.

The present invention has been disclosed above by means of specific embodiments for the purpose of explanation. It is, however, not limited hereupon but comprises all configurations as defined in the accompanying claims. In particular, it is possible to combine individual features as described above even when not explicitly disclosed in combination or in the same context as long as this is technically possible.

The invention claimed is:

1. A torsional vibration damper, comprising:
an outer housing including a flange;
an inner part arranged within and rotatable relative to the outer housing;
a plurality of intermediate pieces arranged around the inner part and spaced apart from each other in circumferential direction so as to form a plurality of chambers filled with a damping medium;
a plurality of leaf spring assemblies having one or more leaf springs, said leaf spring assemblies being arranged in said chambers and having outer end portions engaging with receptacles formed between neighbouring intermediate pieces and inner end portions engaging with the inner part; and
a clamping ring extending around the intermediate pieces and the leaf spring assemblies for securing the leaf spring assemblies between the intermediate pieces;
wherein
the receptacles between neighbouring intermediate pieces and the corresponding radially outer end portions of the leaf spring assemblies taper radially inwardly;
the intermediate pieces are formed integrally on said flange of the outer housing;
the radially outer end portions of the leaf spring assemblies are urged radially into the receptacles by the clamping ring; and
the clamping ring has an inner circumference engaging with the outer end portions of the leaf spring assemblies, wherein the inner circumference tapers axially and the outer end portions of the leaf spring assemblies have correspondingly tapered end faces.

2. The torsional vibration damper of claim 1, wherein the clamping ring is spaced apart from the intermediate pieces by radial gaps.

3. The torsional vibration damper of claim 1, wherein the clamping ring is axially pressed onto the outer end portions of the leaf spring assemblies.

4. The torsional vibration damper of claim 1, wherein the clamping ring is integrally formed with said flange of the outer housing.

5. The torsional vibration damper of claim 4, wherein the leaf spring assemblies are pressed axially into the receptacles between neighbouring intermediate pieces that are formed integrally on said flange and delimited radially by the clamping ring that is formed integrally on said flange.

6. The torsional vibration damper of claim 1, wherein the outer housing comprises a further flange arranged opposite the first mentioned flange, said further flange being secured on said intermediate pieces and extending radially so as to at least partly cover an axial face of the clamping ring.

7. The torsional vibration damper of claim 1, wherein the intermediate pieces are formed integrally on said first mentioned flange though milling.

8. The torsional vibration damper of claim 1, wherein overflow channels are formed between radially inner ends of the intermediate pieces and an outer circumference of the inner part, said overflow channels providing hydraulic connections between neighbouring chambers to cause damping upon damping medium flowing therethrough.

9. The torsional vibration damper of claim 1, wherein axial grooves are formed on the inner part, said axial grooves engaging with inner end portions of the leaf spring assemblies in an articulated manner.

10. The torsional vibration damper of claim 1, wherein the torsional vibration damper is a rotationally elastic coupling.

11. A torsional vibration damper, comprising:
an outer housing including a flange;
an inner part arranged within and rotatable relative to the outer housing;
a plurality of intermediate pieces arranged around the inner part and spaced apart from each other in circumferential direction so as to form a plurality of chambers filled with a damping medium;
a plurality of leaf spring assemblies having one or more leaf springs, said leaf spring assemblies being arranged in said chambers and having outer end portions engaging with receptacles formed between neighbouring intermediate pieces and inner end portions engaging with the inner part; and
a clamping ring extending around the intermediate pieces and the leaf spring assemblies for securing the leaf spring assemblies between the intermediate pieces;
wherein
the receptacles between neighbouring intermediate pieces and the corresponding radially outer end portions of the leaf spring assemblies taper radially inwardly;
the intermediate pieces are formed integrally on said flange of the outer housing;
the radially outer end portions of the leaf spring assemblies are urged radially into the receptacles by the clamping ring;
the clamping ring has an inner circumference engaging with the outer end portions of the leaf spring assemblies, wherein the inner circumference tapers axially and the outer end portions of the leaf spring assemblies have correspondingly tapered end faces; and
the clamping ring is axially pressed onto the outer end portions of the leaf spring assemblies.

12. The torsional vibration damper claim 11, wherein the outer housing comprises a further flange arranged opposite the first mentioned flange, said further flange being secured on said intermediate pieces and extending radially so as to at least partly cover an axial face of the clamping ring.

13. The torsional vibration damper claim 11, wherein the intermediate pieces are formed integrally on said first mentioned flange though milling.

14. The torsional vibration damper claim 11, wherein overflow channels are formed between radially inner ends of the intermediate pieces and an outer circumference of the inner part, said overflow channels providing hydraulic connections between neighbouring chambers to cause damping upon damping medium flowing therethrough.

15. The torsional vibration damper of claim 11, wherein the torsional vibration damper is a rotationally elastic coupling.

16. A torsional vibration damper, comprising:
an outer housing including a flange;
an inner part arranged within and rotatable relative to the outer housing;
a plurality of intermediate pieces arranged around the inner part and spaced apart from each other in circumferential direction so as to form a plurality of chambers filled with a damping medium;
a plurality of leaf spring assemblies having one or more leaf springs, said leaf spring assemblies being arranged in said chambers and having outer end portions engaging with receptacles formed between neighbouring intermediate pieces and inner end portions engaging with the inner part; and a clamping ring extending around the intermediate pieces and the leaf spring assemblies for securing the leaf spring assemblies between the intermediate pieces;

wherein the receptacles between neighbouring intermediate pieces and the corresponding radially outer end portions of the leaf spring assemblies taper radially inwardly;

the intermediate pieces are formed integrally on said flange of the outer housing;

the radially outer end portions of the leaf spring assemblies are urged radially into the receptacles by the clamping ring;

the clamping ring has an inner circumference engaging with the outer end portions of the leaf spring assemblies, wherein the inner circumference tapers axially and the outer end portions of the leaf spring assemblies have correspondingly tapered end faces; and wherein the clamping ring is integrally formed with said flange of the outer housing.

17. The torsional vibration damper of claim 16, wherein the outer housing comprises a further flange arranged opposite the first mentioned flange, said further flange being secured on said intermediate pieces and extending radially so as to at least partly cover an axial face of the clamping ring.

18. The torsional vibration damper of claim 16, wherein the intermediate pieces are formed integrally on said first mentioned flange though milling.

19. The torsional vibration damper claim 16, wherein overflow channels are formed between radially inner ends of the intermediate pieces and an outer circumference of the inner part, said overflow channels providing hydraulic connections between neighbouring chambers to cause damping upon damping medium flowing therethrough.

20. The torsional vibration damper of claim 16, wherein the torsional vibration damper is a rotationally elastic coupling.

\* \* \* \* \*